UNITED STATES PATENT OFFICE.

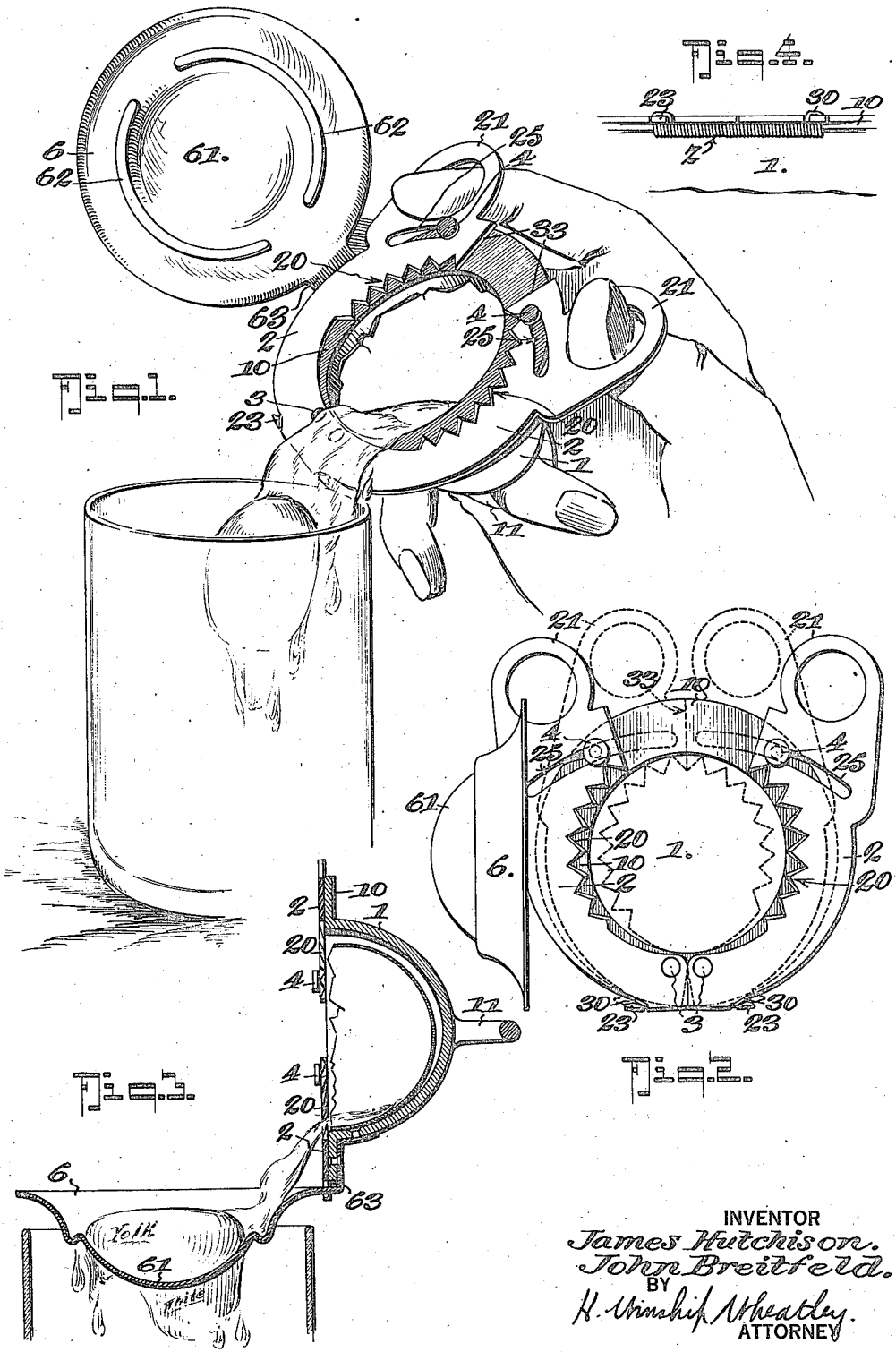

JAMES HUTCHISON AND JOHN BREITFELD, OF NEWPORT, KENTUCKY.

EGG BREAKER AND SEPARATOR.

1,254,326.

Specification of Letters Patent. Patented Jan. 22, 1918.

Application filed October 15, 1917. Serial No. 196,718.

*To all whom it may concern:*

Be it known that we, JAMES HUTCHISON and JOHN BREITFELD, citizens of the United States, residing at Newport, in the county of Campbell and State of Kentucky, have invented a new and Improved Egg Breaker and Separator, of which the following is a specification.

Our invention has reference to improvements in kitchen utensils and primarily it has for its purpose to provide a simple, inexpensive and easily manipulated device for rapidly breaking eggs without the least danger of breaking the yolk.

Another object of our invention is to provide a device of the general character mentioned that may be conveniently manipulated for breaking eggs without danger of breaking the yolk and after breaking the egg, capable of being quickly manipulated for separating the white from the yolk and retain the yolk in its unbroken condition.

With the above and other objects in view, our invention embodies a device of the character mentioned of certain peculiar features of construction and arrangement of parts, all of which will be hereinafter explained, specifically pointed out in the appended claims and illustrated in the accompanying drawings, in which:

Figure 1 is a perspective view of our invention in operation.

Fig. 2 is a front view, the cutter blades being shown in their normal position in full lines and in the egg breaking position in dotted lines.

Fig. 3 is a section on the line 3—3 on Fig. 2 showing an egg as being poured through the separator.

Fig. 4 is a detail side view of the blade tension spring.

Our device comprises a cup shape body or holder 1 of suitable material, preferably aluminum.

At the open or front end, the body or holder 1 includes an annular, flat rim 10 and at the rear or back end, it has an integral loop or eye member 11, the purpose of which will presently appear.

2—2 designate a pair of oppositely disposed shell breakers, each consisting of a substantially semi-circular thin flat blade, the inner edge of which is formed with a series of V-shaped teeth 20.

Each shell breaker or cutting blade is connected, at one end, to the rim 10 by a pivot rivet 3—3, the pivots of the said two blades being close together and located near the edge of the egg receiving opening of the cup shaped body 1.

Each shell breaker or blade 2 is of such length that the end thereof, opposite the pivot end, projects sufficiently beyond the body rim 10 to provide for a finger loop 21 and the said blades are normally swung apart so that their toothed or cutting edges clear the egg receiving opening, as is clearly shown in Fig. 4, by reference to which it will be also observed the said blades are normally swung out to the extended position by a coil spring $z$, the opposite ends 30—30 of which are connected to hook portions 23 formed on the pivot ends of the blades 2 and to limit the outward swing of the said blades 2, each blade near its finger loop 20 has a segmental slot 25 that rides over a stop rivet 4.

6 designates an egg separator that consists of a dish shaped body having a central or yolk receiving cavity 61 and a series of segmental slots 62.

Separator 6 also includes a lateral extension 63 that is bent up to form a suitable bracket for attaching the said separator to the body 1 in such manner that it extends laterally of the body at right angles thereto and in position for receiving the contents of the egg from the broken shell, when it is desired to separate the white from the yolk and keep the yolk whole.

From the foregoing taken in connection with the drawings, the complete construction, the manner of use, and the advantages of our device will be readily apparent.

To break the egg shell without the least danger of breaking the yolk, the user holds the device in one hand with the third or little finger bent through the eye member or loop 11 and with the first finger and the thumb through the finger loop 21—21 and, when thus held, the egg is placed in the breaker and the shell is crushed at about the middle of the egg by pulling the cutter blades 2—2 together by the thumb and finger pressure, and since the inward swing of the two blades 2—2 is limited by their adjacent edges 33—33 abutting, as shown, it is impossible to cut through or break the yolk.

After breaking the shell in the manner indicated, the entire contents of the shell portion, held within the body 1, can be readily dumped in the manner clearly shown in Fig. 2 of the drawings.

After breaking the shell in the manner stated, if the user wishes to separate the white of the egg from the yolk, the contents of the shell, after being broken, are ejected into the separator in the manner shown in Fig. 3 of the drawings, it being understood that as the white of the egg passes through the slots in the separator and into a suitable receiver, the yolk remains intact in the central cavity of the separator.

The cutter blades, in practice, are preferably of nickel plated steel.

What we claim is:

1. An egg breaker and separator comprising a body having an egg receiving socket, shell crushing elements attached to the body and movable across the socket thereof and a separator connected to the body and projected at right angles to the socketed face of the body, whereby the contents of the crushed shell may be poured from the shell onto the said separator.

2. An egg breaker and separator comprising a body having an egg receiving socket, shell crushing elements attached to the body and movable across the socket thereof and a separator connected to the body and projected at an angle to the socketed face of the body, whereby the contents of the crushed shell may be poured from the shell onto the said separator.

3. As a new article, a device for the purpose stated comprising a body shaped for being conveniently held in the hand and including a finger receiving loop at the inner end, the outer portion having an egg receiving socket and a flat annular rim, a pair of oppositely disposed blades having cutting edges, the said blades being pivotally connected at one end to the flat rim, the other ends of the blades extending beyond the rim and formed with finger loops, means tending to normally swing the blades to the open position, the said blades being adapted, under finger pressure, to close over the egg socket opening, means that limit the closure movement of the blades and an egg separator attached to the body and projected forwardly from and at right angles to the plane of the rim face of the body.

4. An egg breaker consisting of a body having an egg receiving socket at one side, a flat rim surrounding the socket opening and a finger loop projected centrally from the other side thereof; combined with egg crushing elements pivotally mounted on the body rim to close over the egg socket opening, said elements including finger loops for receiving the thumb and forefinger of the user.

JAMES HUTCHISON.
JOHN BREITFELD.